United States Patent [19]

Gale

[11] 4,081,655

[45] Mar. 28, 1978

[54] METHOD OF DEBURRING INTERSECTING DRILLED HOLES

[75] Inventor: Preston Lee Gale, East Peoria, Ill.

[73] Assignee: Caterpillar Tractor Co., Peoria, Ill.

[21] Appl. No.: 607,075

[22] Filed: Aug. 22, 1975

[51] Int. Cl.$^2$ ............................................. B23K 26/00
[52] U.S. Cl. .............................. 219/121 LM; 408/701
[58] Field of Search .... 219/121 L, 121 LM, 121 EM; 408/701, 187

[56] References Cited

U.S. PATENT DOCUMENTS

| | | | |
|---|---|---|---|
| 3,455,239 | 7/1969 | Smith | 219/121 LM |
| 3,472,998 | 10/1969 | Popick et al. | 219/121 L |
| 3,528,424 | 9/1970 | Ayres | 219/121 L |
| 3,632,398 | 1/1972 | Koning | 219/121 LM |
| 3,755,646 | 8/1973 | Muller | 219/121 LM |
| 3,766,616 | 10/1973 | Staudte | 219/121 LM |
| 3,806,271 | 4/1974 | Ishiguro et al. | 408/187 |

FOREIGN PATENT DOCUMENTS 1,367,801  9/1974  United Kingdom ................. 408/187

OTHER PUBLICATIONS

"The Laser as a Machine Tool", Engineering, July 1968.
J. F. Ready, "Laser Applications in Metalworking", The Tool & Manufacturing Engineer, 3/1969, pp. 24–28.

Primary Examiner—J. V. Truhe
Assistant Examiner—Clifford C. Shaw
Attorney, Agent, or Firm—Phillips, Moore, Weissenberger, Lempio & Majestic

[57] ABSTRACT

A method of removing the burrs at the junction of a drilled hole with a passageway previously formed in a metal part by means of a high power laser beam is disclosed. Novel steps in the control of the laser beam to avoid damage to the walls of the passageway or intersecting drilled hole are described.

5 Claims, 5 Drawing Figures

U.S. Patent     March 28, 1978     4,081,655
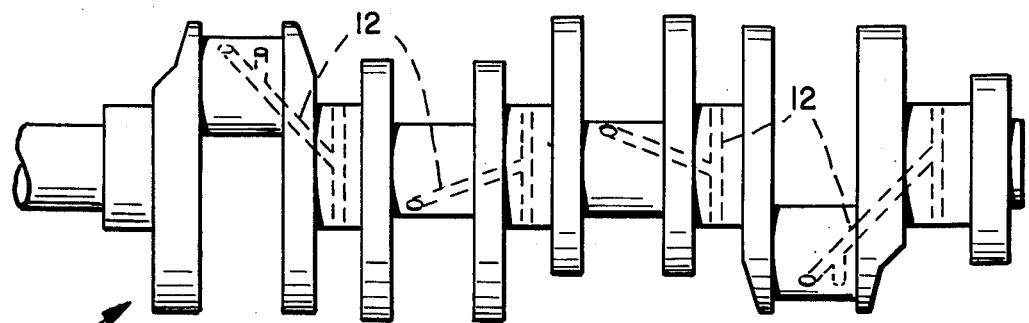
FIG _ 1
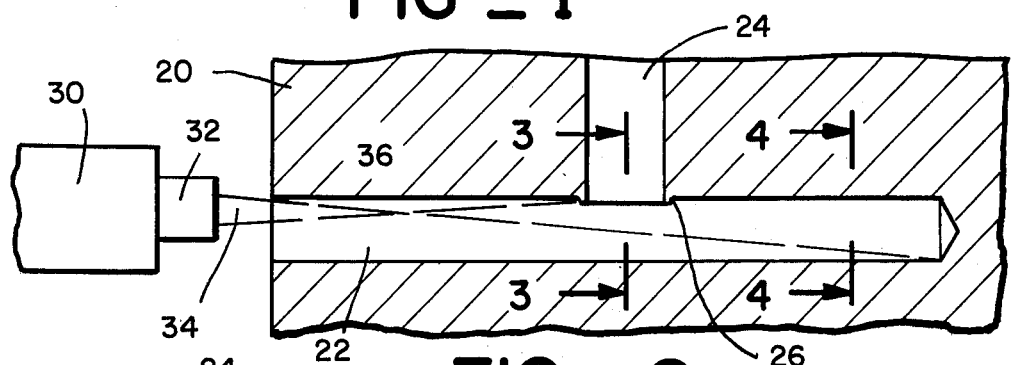
FIG _ 2
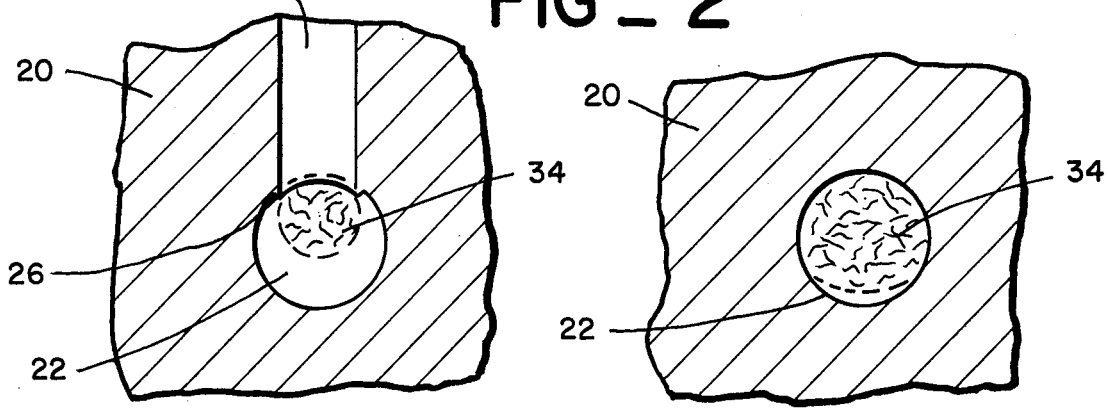
FIG _ 3     FIG _ 4
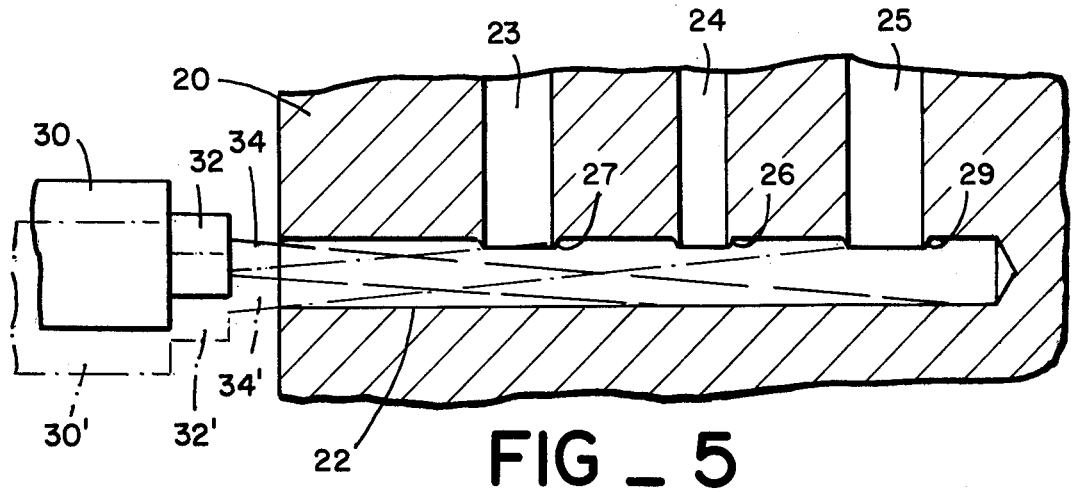
FIG _ 5

METHOD OF DEBURRING INTERSECTING DRILLED HOLES

BACKGROUND OF THE INVENTION

This invention relates to the removal of burrs at the exit end of drilled holes, especially in manufactured metal parts, and more particularly to a method of using a high power laser beam to remove burrs at the exit end of such holes.

In the manufacture of machinery of various kinds it is often necessary to provide intersecting passageways in various metal parts thereof. Often, one of such passageways will receive a plunger or shaft and the passageway intersecting therewith will provide for the flow of lubricating oil or other fluid thereto.

In any event, such intersecting passageways are usually formed by forming a passageway into the manufactured metal part and subsequently drilling a hole into the metal part which intersects the passageway. It is a well-known fact that when a hole is drilled through a surface of a metal part, a thin protruding rough rim or edge will be formed about the hole in such surface due to the fact that a portion of the drill will tend to exit from the metal part extruding some small amount of incompletely cut metal from the hole in the process. Such a thin protruding rim or edge is known as a "burr" and will tend to be formed at the junction of a drilled hole with a previously formed passageway in a metal part.

It is, of course, necessary to remove any such burrs from the interior of the passageway, since such burrs will change the internal dimensions thereof and interfere with the passage of fluids, shafts or plungers through the passageway which may be a first drilled hole. In the prior art, various time consuming and expensive mechanical methods have been used to remove such burrs. For example, where the passageway is formed by a first drilled hole, the drill may be passed into it a second time or other special tools may be used within the passageway to mechanically remove the burrs. There is, of course, the danger that the material which forms the burr in the passageway will not be removed but simply forced into a different burr inside the end of the drilled hole, as well as the danger that the internal dimensions of the passageway will be spoiled by misalignment of the drill or other tool therewith. If the material which forms the burr is not removed but simply relocated, then there is the danger that some or all of such material will subsequently break away and cause damage somewhere else in the machine.

It is the basic object of this invention to provide a method for quickly and efficiently removing burrs from the junction of drilled holes with a surface or passageway in metal parts, which method will result in the complete removal of material which forms such burrs without danger of spoiling the surface or the internal dimensions of the passageway or drilled holes.

SUMMARY OF THE INVENTION

Briefly, the burr produced at the junction of a drilled hole in a metal part with a passageway previously formed in the metal part and extending along an axis from an opening to the outside thereof is removed according to this invention by producing a high power beam of coherent electromagnetic energy which is focused to a maximum cross-sectional diameter in the focal plane thereof smaller than the minimum cross-sectional dimension of such passageway. The focal plane of the beam is positioned substantially normal to the axis of the passageway and is located with respect to the opening of the passageway so that all of the beam will enter the passageway. The axis of the beam is positioned with respect to the axis of the passageway so that a peripheral portion only of the beam downstream from the focal plane thereof impinges the burr at the junction of the drilled hole with the passageway.

DESCRIPTION OF THE DRAWING

The foregoing and other objects and features of this invention will be more fully apparent from a reading of the following detailed description of the method of this invention in conjunction with the drawing wherein:

FIG. 1 is a side view in elevation of a crank shaft having intersecting drilled holes or passageways therein as indicated by dotted lines to which the method of this invention may be applied with advantage;

FIG. 2 is an enlarged fragmentary cross-sectional view of a metal part showing the metal burr formed at the junction between a drilled hole and another passageway therein with a laser and a focused beam of coherent electromagnetic energy schematically represented in operational position with respect to the metal part for the removal of the burr in accordance with the teaching of this invention;

FIG. 3 is a fragmentary cross-sectional view taken along line 3—3 of FIG. 2 with the beam of coherent electromagnetic energy indicated schematically in operative relation to the burr;

FIG. 4 is a fragmentary cross-sectional view taken along line 4—4 of FIG. 2 with the beam of coherent electromagnetic energy represented schematically; and FIG. 5 is a fragmentary cross-sectional view of a metal part similar to FIG. 2 but showing a plurality of drilled holes intersecting a passageway therein.

DETAILED DESCRIPTION OF THE INVENTION

Referring to FIG. 1, a manufactured metal part 10 for a machine to which the teaching of this invention may be applied with advantage, is shown in side elevation. The metal part 10 is a steel forging in the form of a crankshaft for a diesel engine and includes a number of intersecting passageways or oil holes indicated by dotted lines 12. To provide a frame of reference, the crankshaft has a length of about 30 inches and a maximum diameter of about 8 inches. The intersecting oil holes indicated by dotted lines 12 have a diameter of about ½ inch and are drilled into the crankshaft after it is forged and ground. The intersections of the oil holes must be free of chips and burrs and the crankshaft must pass a number of other stringent inspections before it can be assembled with other parts into a diesel engine.

As is well known, whenever a hole is drilled in a metal part, which intersects a passageway such as another drilled hole in the part, a thin protruding rough rim or edge called a "burr" will be formed at the junction between the drilled hole and the passageway. Referring to FIG. 2, a manufactured metal part such as the crankshaft of FIG. 1 is shown in fragmentary cross-section with a passageway 22 formed therein and extending along an axis from an opening to the outside of the metal part 20. The passageway 22 may be formed by drilling a hole into the metal part 20, for example. In any event, a subsequently drilled hole 24 is shown intersecting the passageway 22. As indicated in idealized form in FIG.

2, the subsequent drilling of the intersecting hole 24 produces a thin projecting rim edge or burr about the hole 24 at the junction thereof with the passageway 22. This is the burr which must be removed before the metal part 20 can be incorporated into a machine.

According to the teaching of this invention, such burr is removed through the use of a high power laser 30 shown schematically in FIG. 2. The laser 30 includes a focusing means 32 by which the beam (indicated by dash lines 34) of coherent electromagnetic energy produced by the laser is focused to a maximum cross-sectional diameter in the focal plane 36 thereof which is smaller than the minimum cross-sectional dimension of the passageway 22. The laser 30 and focusing means 32 are positioned with respect to the passageway 22 so that the focal plane 36 of the focused beam is substantially normal to the axis of the passageway 22. As shown in FIG. 2, the focal plane 36 of the beam 34 is located within the passageway 22, however it is only necessary according to the teaching of this invention that the focal plane be properly located so that all of the beam 34 will enter the passageway with none of the beam 34 impinging on the exterior of the metal part 20 about the opening of the passageway 22.

The focal length of the focusing means 32 should be comparatively short with respect to the length of the passageway 22 so that the beam 34 will diverge within the passageway 22 from its focal plane 36. According to the teaching of this invention, the focal plane 36 of the beam 34 must be located between the laser 30 including the focusing means 32 and the junction between the drilled hole 24 and passageway 22. In addition, according to the teaching of this invention, the axis of the beam 34 must be positioned with respect to the axis of the passageway 22 so that a peripheral portion only of the beam 34 downstream from the focal plane 36 impinges upon the burr 26 formed at the junction between the drilled hole 24 and the passageway 22.

Referring to FIG. 3, the impingement of a peripheral portion of the diverging beam 34 on the burr 26 formed at the junction between the drilled hole 24 and the passageway 22 in the metal part 20 is shown. Since the burr 26 is thin and projects from the metal part 20 into the passageway 22, it will be heated rapidly to a very high temperature by the energy of the beam 34. Due to the poor heat conducting capability of thin projecting metallic elements, the burr 26 will be heated to a temperature high enough to cause it to vaporize by the impingement of the beam 34 thereon.

However, as shown in FIGS. 2 and 4, the energy of the diverging beam 34 will tend to be distributed along and about the wall of the passageway 22 downstream of the burr 26. Due to the distribution of such energy over a large area and the good heat conducting capability of the metal part 20 at the walls of the passageway 22, the temperature rise at such walls due to the absorption of the energy from the beam will be small. In any event, the energy of the beam 34 and the heating produced thereby will be sufficiently distributed along the walls of the passageway 22 and conducted therefrom into the metal part 20 to prevent any temperature effects whatever at such walls of the passageway 22.

Referring to FIG. 5, the same metal part 20 and passageway 22 are shown in fragmentary cross-section. However, in addition to the drilled hole 24, two additional drilled holes 23 and 25 are shown intersecting the passageway 22 at different points along the axis thereof. According to this invention the relative positioning of the laser 30 and focusing means 32 with respect to the opening of the passageway 22 is readily adjustable. Thus, in order to remove the burr 27 at the junction between the drilled hole 23 and the passageway 22, the spacing between the laser 30 and the opening of the passageway 22 may be increased to move the focal plane 36 of the beam closer to such opening. At the same time, the laser 30 may be shifted upwardly as shown in full in FIG. 5, with respect to the opening of the passageway 22 thereby enabling a peripheral portion only of the beam to impinge upon the burr 27. The diverging portion of the beam will, of course, be distributed along the upper portion of the remainder of the passageway 22 as described hereinabove.

Similarly, in order to remove the burr 29 at the junction between the drilled hole 25 and passageway 22, the spacing between the laser 30' and the opening of the passageway 22 may be increased and the laser shifted downwardly as shown in phantom in FIG. 5 with respect to the opening of the passageway 22. This will enable a peripheral portion only of the beam to impinge upon the burr 29 with the remainder of the diverging beam being distributed along the lower portion of the passageway 22.

In addition, the power of the focusing means 32 may be made adjustable so that the distance between such focusing means and the focal plane of the beam may be adjusted. Furthermore, it would be possible, according to this invention, to provide for a limited angular movement of the axis of the beam with respect to the axis of the passageway 22. In other words, provision may be made for tilting the focal plane of the beam a few degrees away from absolute normal in any direction in order to obtain optimum impingement of a peripheral portion of the beam on a particular burr.

It has been found that the method of this invention will not only remove the burrs at the junction between a passageway and an intersecting drilled hole but will also provide highly desirable smoothly rounded corners at such junctions. Since the burrs are vaporized by the action of the laser beam thereon, there is little danger of the presence of undetected chips of such burrs remaining in the metal part 20 after the deburring operation. Also, there is little danger of spoiling the internal dimensions of the passageway 22 during the deburring operation due to the inherent distribution of the energy of the laser beam along the walls of the passageway 22 and the excellent heat sink properties of the metal part 20 at the walls of such passageway.

It is believed that those skilled in the art will find many applications for the teaching of this invention. Various obvious steps could, of course, be added to the method taught hereinabove in order to adapt such method for a specific application. For example, light guide devices comprising articulated assemblies of mirror or lens holding and rotating tubes are known which could be used to facilitate the manual control and application of the laser beam to a complicated metal part such as the crankshaft of FIG. 1 in accordance with the teaching of this invention while allowing both the metal part and the laser to remain stationary.

In an actual reduction to practice of the method of this invention, a $CO_2$ laser capable of producing a coherent beam of electromagnetic energy having a wavelength of 10.6 micrometers at a power output between about 1000 watts and about 3000 watts was used to deburr a crankshaft substantially as shown in FIG. 1. The time required to complete the deburring operation according to this invention, was comparable, although not optimized, to that required for conventional deburring operations. The complete removal of the burrs and rounding of the corners at the junction of the passageways was produced and no spoilage of the passageways resulted even though the deburring operation according to this invention as practiced was not optimized. As used herein, the term "high power" laser beam means a laser beam at a power level in excess of about 100 watts.

What is claimed is:

1. In the method of providing a drilled hole in a metal part intersecting a passageway previously formed in the metal part and extending along an axis from an opening to the outside thereof, removing the burr produced at the intersection by the steps of:
   a. producing a high power beam of coherent electromagnetic energy:
   b. focusing said high power beam of coherent electromagnetic energy to a maximum cross-sectional diameter in the focal plane thereof smaller than the minimum cross-sectional dimension of said passageway;
   c. positioning the focal plane of said focused beam substantially normal to said axis of said passageway between the source of said focused beam and said burr;
   d. locating the focal plane of said beam with respect to said opening of said passageway so that all of said beam enters said passageway; and
   e. positioning the axis of said beam with respect to said axis of said passageway so that a peripheral portion only of said beam downstream from said focal plane impinges said burr at the junction of said drilled hole with said passageway.

2. The method as claimed in claim 1 including the step of producing said high power beam of coherent electromagnetic energy by means of a laser operating at a wavelength of about 10.6 micrometers and at a power level between about 1000 watts and about 3000 watts.

3. The method as claimed in claim 1 including the step of locating said focal plane at a point intermediate said opening of said passageway and said burr.

4. The method as claimed in claim 1 including the step of tilting said focal plane of said focused beam not more than a few degrees away from normal with respect to said axis of said passageway as required to obtain optimum impingement of said peripheral portion only of said beam on said burr.

5. The method of claim 1 including the step of shifting said axis of said beam to a spaced parallel position with respect to said axis of said passageway as required to obtain optimum impingement of said peripheral portion only of said beam on said burr.

* * * * *